Nov. 2, 1943.        J. H. MICHAEL        2,333,616
CONTROL SYSTEM
Filed May 23, 1942
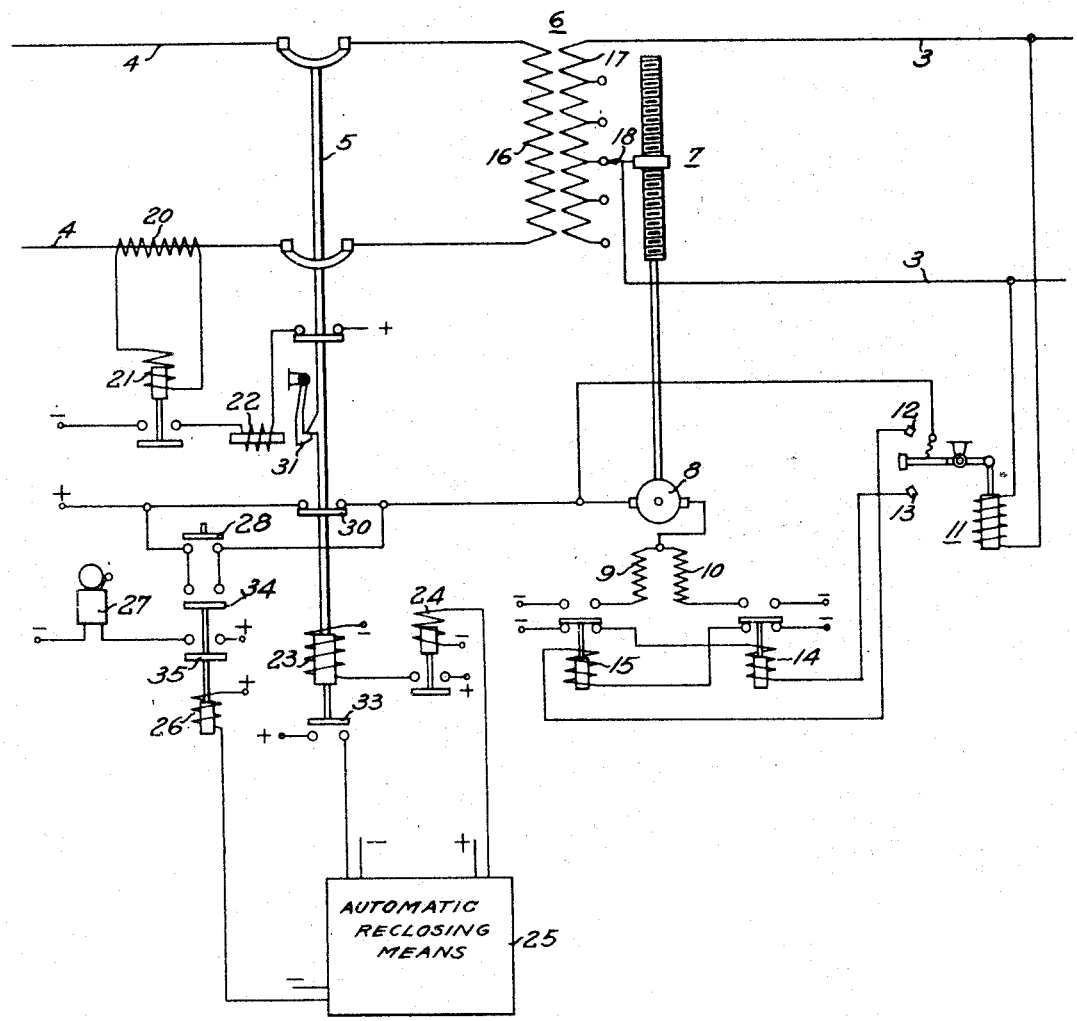
Inventor
J. H. Michael
by Harold S. Silver
Attorney Patented Nov. 2, 1943

2,333,616

UNITED STATES PATENT OFFICE 2,333,616

CONTROL SYSTEM

John H. Michael, West Allis, Wis., assignor to Allis-Chalmers Manufacturing Company, Milwaukee, Wis., a corporation of Delaware Application May 23, 1942, Serial No. 444,174

5 Claims. (Cl. 171—119)

This invention relates in general to electric distribution systems and in particular to systems of the type including a reclosing circuit breaker utilized to protect a transformer having associated therewith tap changing apparatus for regulating the voltage of a load circuit.

In prior art systems of this type, an interlocking arrangement between the tap changing apparatus and the reclosing relay of a circuit breaker has been provided to prevent operation of the tap changing apparatus during operation of the reclosing relay. This has been done, for example, in the system shown in United States Letters Patent 2,202,722, A. E. Anderson, granted May 28, 1940, by opening the circuit to the tap changing motor whenever the timing motor of the reclosing means is energized. As the usual timing cycle for automatic reclosing circuit breakers is set for about three minutes, the tap changing apparatus is prevented from operating during this time, although the abnormal condition causing tripping of the circuit breaker may be but short lived and the circuit breaker remain closed upon the first reclosure. Thus regulation of the voltage may be unnecessarily prevented for a substantial time.

It is therefore an object of the present invention to provide an interlock between an automatic reclosing circuit breaker and a tap changing apparatus in a distribution system of the above type, such that the tap changing apparatus will be inoperative during abnormal circuit conditions but will become operative again as soon as the abnormal condition has subsided, and the circuit breaker has reclosed.

Objects and advantages other than those above set forth will be apparent from the following description when read in connection with the accompanying drawing, in which the single figure illustrates a system of distribution embodying the present invention.

The drawing illustrates an electric distribution system in which a load circuit 3 is connected to a power transformer 6 through one of the taps on the secondary winding 17. The primary winding 16 of transformer 6 is connected to a supply circuit 4 through the contacts of an automatically reclosing circuit breaker 5. The voltage of the load circuit 3 is controlled by means of a tap changing mechanism 7 actuated by a reversible motor 8.

The tap changing motor 8 is controlled in accordance with the voltage of the load circuit 3 by means of a voltage responsive relay 11 which closes contacts 12 upon decrease, and closes contact 13 upon increase, of the load circuit voltage below or above a predetermined value. Closure of contact 12 energizes relay 15 through an interlocking contact on relay 14 to energize the field 9 and thereby rotate the tap changing motor 8 in a direction to move the contact 18 downward to the next tap to increase the load circuit voltage. Conversely, closure of contact 13 energizes relay 14 through an interlocking contact on relay 15, to energize field 10 of the tap changing motor 8 to move the contact 18 upward to the next tap to decrease the voltage on the load circuit 3.

The automatic reclosing circuit breaker 5 is of any suitable type, examples of which are well known in the art. The circuit breaker 5 is illustrated as having a trip coil 22 energizable through the contacts of a relay 21 operable upon a predetermined increase of current in the current transformer 20. Upon energization of the trip coil 22, the latch 31 is disengaged thereby permitting the circuit breaker 5 to open. The transformer 6 is thus disconnected from the supply circuit 4. Although the circuit breaker 5 has been illustrated as being on the supply circuit side of transformer 6, it may as well be placed on the load side of the transformer. If desired, several load circuits may be regulated by one tap changer 7 and protected by one or more circuit breakers 5.

An automatic reclosing means 25 of conventional type is provided for reclosing the circuit breaker 5. This means 25 is energized by the opening of the circuit breaker 5, through closure of a back contact 33. Closure of contact 33 starts the timing cycle of the reclosing means 25 which, after a predetermined time, energizes the relay 24 to energize the reclosing coil 23 to reclose the circuit breaker 5. The reclosing means 25 has been illustrated merely by the rectangle shown, in that the invention herein is independent of the particular type of reclosing means used. This means 25 may be of the type illustrated in the above Anderson patent.

If the fault condition persists after reclosure of the circuit breaker 5, the trip coil 22 will again be energized, again opening the circuit breaker 5. The reclosing means 25 provides for a predetermined number of reclosures, usually three, with increasing time delay periods therebetween. If the fault condition then persists, the relay 24 is locked out so that the circuit breaker 5 cannot be reclosed. Upon locking out of the relay 24, the relay 26 is energized and a circuit containing an alarm 27 is energized through contact 35.

It is desirable to prevent operation of the tap changer 7 during abnormal conditions in the distribution system, but to permit operation thereof at all times when normal conditions prevail. To accomplish this result, the energizing circuit for the tap changer motor 8 is connected through a back contact 30 on the automatic reclosing circuit breaker 5. Thus, when the circuit breaker 5 is open the tap changer motor 8 cannot be energized in either direction to make a tap change at the transformer 6.

Contact 30 is, however, closed at all times when the circuit breaker 5 is reclosed independently of energization of the tap changing motor 8. The timing cycle of the usual reclosing means is about three minutes before lockout occurs. If, therefore, upon the first reclosure of circuit breaker 5, the fault condition has disappeared, the tap changer motor 8 may be energized to make a regulating change without waiting for the reclosing means 25 to complete its timing cycle. This permits any necessary regulation of the load circuit 3 to be prevented only during the time the circuit breaker 5 is open due to actual abnormal conditions.

As above stated, a plurality of load circuits may be energized from a transformer regulated by a single tap changing mechanism. In such cases it is desirable to provide for tap changing operation for the benefit of the other circuits even though one circuit breaker be locked out. A contact 34 is therefore provided on the lockout relay 26 which closes a circuit shunting the then open contact 30, thereby permitting energization of the tap changing motor 8. If a circuit breaker 5 is to be removed from service for maintenance work or for any other reason it would also be desirable to permit operation of the tap changing motor 8 for regulation of any other circuit connected to the transformer 6. A manually operable switch 28 is provided for this purpose and it, similarly through the contact 34, closes a shunt circuit around the contact 30.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. A system of electric distribution comprising a transformer having a winding provided with a pulrality of taps, tap changing mechanism for changing the connections to said taps, a circuit breaker controlling the current in said transformer winding, fault responsive means connected with said system for effecting the opening of said circuit breaker, means for automatically reclosing said circuit breaker when it is opened, control means responsive to a predetermined condition of said circuit for controlling the operation of said tap changing mechanism, means for preventing operative control of said tap changing mechanism by said control means, and means whereby said control preventive means is ineffective at all times when said circuit breaker is in open position.

2. A system of electric distribution comprising a transformer having a winding provided with a plurality of taps, tap changing mechanism for changing the connections to said taps, a circuit breaker controlling the current in said transformer winding, fault responsive means connected with said system for effecting the opening of said circuit breaker, means for automatically reclosing said circuit breaker when it is opened, control means including a tap changer motor for actuating said tap changing mechanism in accordance with the voltage of said distributing system, and means for energizing said tap changer motor, subject to operation of said control means, through a back contact on said circuit breaker independently of energization of said automatic reclosing means.

3. A system of electric distribution comprising a transformer having a winding provided with a plurality of taps, tap changing mechanism for changing the connections to said taps, a circuit breaker controlling the current in said transformer winding, fault responsive means connected with said system for effecting the opening of said circuit breaker, means for automatically reclosing said circuit breaker a predetermined number of times, control means including a tap changer motor for actuating said tap changing mechanism in accordance with the voltage of said distribution system, means for energizing said tap changer motor through a back contact on said circuit breaker, and means for shunting said back contact after reclosure of said automatic reclosing means said predetermined number of times upon persistence of said fault condition.

4. A system of electric distribution comprising a transformer having a winding provided with a plurality of taps, tap changing mechanism for changing the connections to said taps, a circuit breaker controlling the current in said transformer winding, fault responsive means connected with said system for effecting the opening of said circuit breaker, means for automatically reclosing said circuit breaker when it is opened, control means responsive to a predetermined condition of said circuit for controlling the operation of said tap changing mechanism, and means including a back contact on said circuit breaker for providing operative control of said tap changing mechanism by said control means at all times when said circuit breaker is in closed position.

5. A system of electric distribution comprising a transformer having a winding provided with a plurality of taps, tap changing mechanisms for changing the connections to said taps, a circuit breaker controlling the current in said transformer winding, fault responsive means connected with said system for effecting the opening of said circuit breaker, means for automatically reclosing said circuit breaker when it is opened, control means responsive to a predetermined condition of said circuit for controlling the operation of said tap changing mechanism, means for preventing operative control of said tap changing mechanism by said control means, and means whereby said control preventive means is operatively dependent upon the position of said circuit breaker.

JOHN H. MICHAEL.